United States Patent [19]

DeBisschop

[11] 4,073,162
[45] Feb. 14, 1978

[54] THRUST WASHER STRIP

[75] Inventor: James George DeBisschop, Thomaston, Conn.

[73] Assignee: The Torrington Company, Torrington, Conn.

[21] Appl. No.: 710,624

[22] Filed: Aug. 2, 1976

[51] Int. Cl.² .................... B65D 73/02; F16B 39/28; F16D 3/33
[52] U.S. Cl. .................................. 64/17 R; 64/17 A; 85/50 R
[58] Field of Search ............... 64/17 R, 17 A, 17 SP; 308/163, 164, 165; 85/50, 31, 17; 206/343, 344

[56] References Cited

U.S. PATENT DOCUMENTS

| | | | |
|---|---|---|---|
| 1,121,144 | 12/1914 | Sporsel | 64/17 R |
| 1,167,455 | 1/1916 | Watts | 64/17 R |
| 1,354,912 | 10/1920 | Lockton et al. | 64/17 R |
| 3,073,630 | 1/1963 | Kuhn, Jr. | 64/17 A |
| 3,740,969 | 6/1973 | Shotter | 64/17 A |
| 3,899,074 | 8/1975 | Lucas | 206/343 |

Primary Examiner—Benjamin W. Wyche
Assistant Examiner—R. C. Turner
Attorney, Agent, or Firm—Frank S. Troidl

[57] ABSTRACT

This is a plastic thrust washer strip consisting of a plurality of plastic thrust washers integrally interconnected by thin plastic webs. The plastic webs and integral plastic tabs on each washer of the strip serve to locate and hold the washer strip on the hub of a universal joint.

6 Claims, 3 Drawing Figures

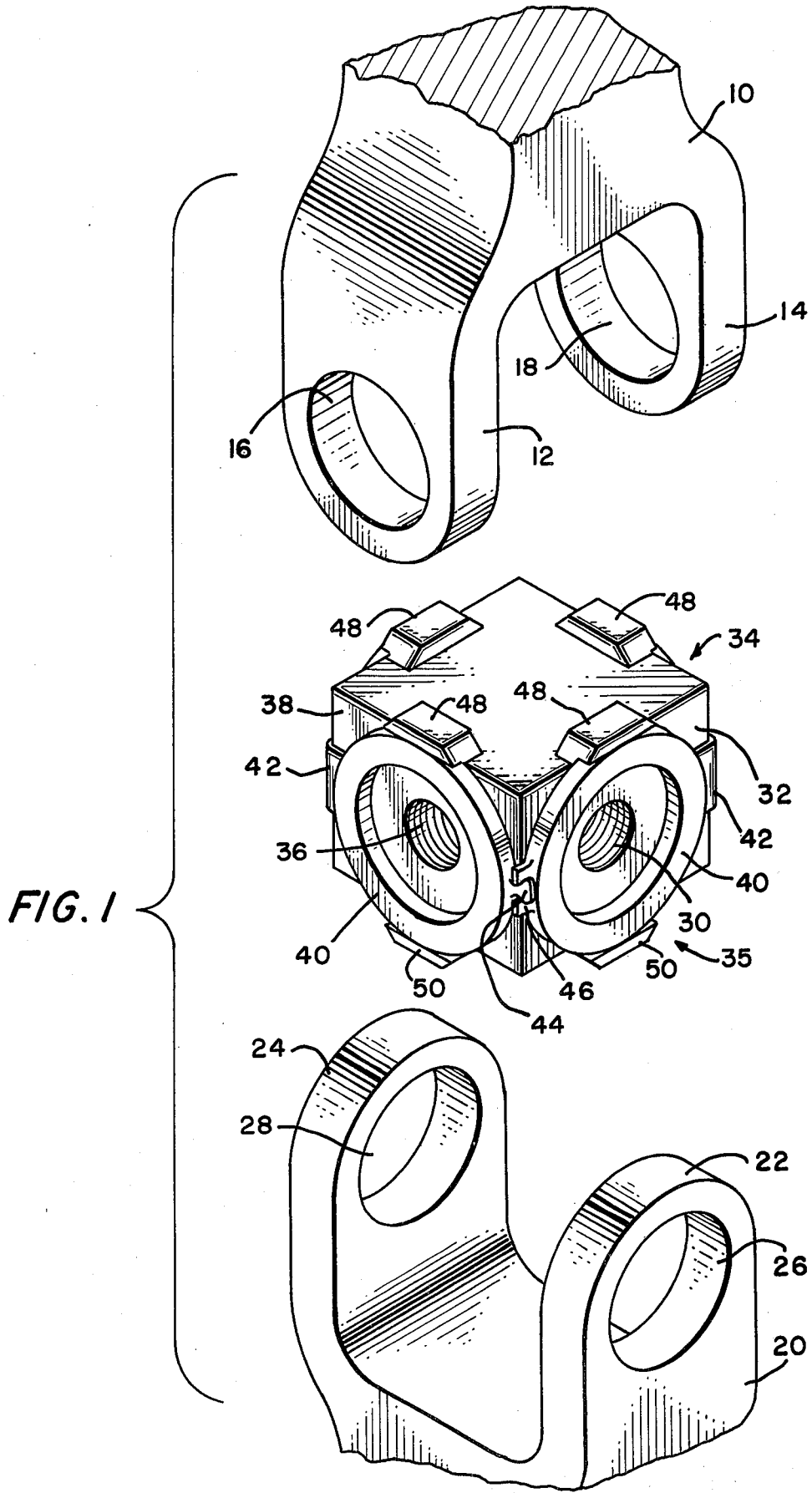

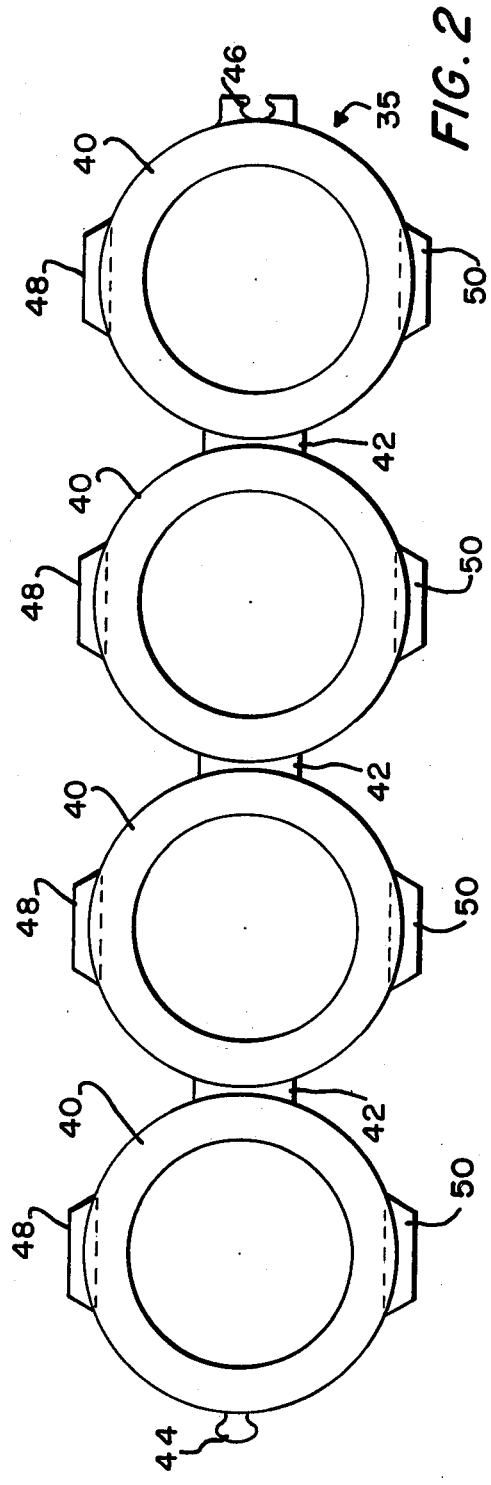
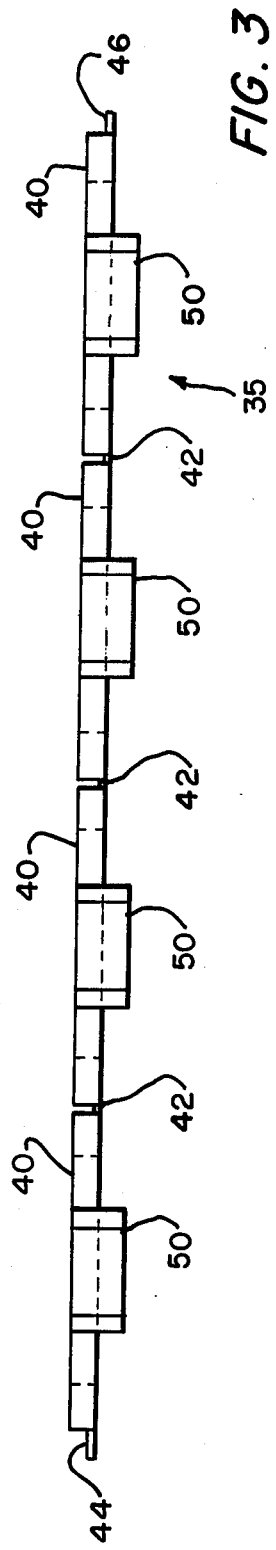

THRUST WASHER STRIP

This invention relates to universal joints. More particularly, this invention is a plastic thrust washer strip including a plurality of plastic thrust washers integrally interconnected by thin plastic webs, to be used between the hub and the yoke arms of a universal joint or similar article.

In some currently utilized universal joints, such as universal joints used in some automobile steering mechanisms, individual plastic thrust washers are located between the surfaces of the hub of the universal joint and each arm of each yoke of the joint. These thrust washers reduce rubbing friction between hub and arms, and also act as dirt shields or seals. Four individual washers are used, with at least two molded-in lugs or feet on each washer fitted into blind holes drilled into each of four faces of the hub to properly locate the washers for assembly and service of the universal joint. There are distinct problems with this system, such as: drill wear; drill breakage; disposal of chips from the drilling operation; elimination of chips remaining in the blind holes; handling four individual washers per universal joint; locating the legs of the individual washers in the blind holes; keeping the loose washers in place on the hub during further assembly of the universal joint.

My integral strip of four interconnected thrust washers eliminates these costly problems. The washer strip is molded just as fast as are four individual washers. The strip is handled as one piece instead of four; the strip is easily and quickly wrapped around the hub and fixed in place; the thin wab hinges and the tabs make the washers self-locating on the hub faces; the clasp and hinges and tabs hold the strip assembled on the hub during further assembly of the universal joint, whereas individual unconnected washers readily fall out of position away from the hub unless restrained by some external means. No drilling machines are needed to drill blind locating holes; there are no drill bits, no drill sharpening, no drill breakage; no holding fixtures are required to properly locate and hold the hub for drilling; no chips are produced so none need be cleared away and disposed of; no cutting oil is needed for drilling and so no cutting oil mess need be cleaned up.

Briefly described, the invention is a plastic thrust washer strip comprising a plurality of integrally interconnected plastic thrust washers with integral means for locating and attaching the thrust washer strip on the hub of a universal joint.

The invention, as well as its many advantages, will be further understood by reference to the following detailed description and drawings in which:

FIG. 1 is an exploded perspective view showing the plastic thrust washer strip mounted on the hub of a universal joint and also showing the co-operating yoke arms not yet assembled around it;

FIG. 2 is a plan view of the plastic washer strip; and

FIG. 3 is a side view of the plastic washer strip.

In the various figures, like parts are referred to by like numbers.

Referring to the drawings, and more particularly to FIG. 1, the universal joint includes a yoke 10 with bifurcated arms 12 and 14. The arms 12 and 14 are provided with aligned bores 16 and 18, respectively.

A second yoke 20 having bifurcated arms 22 and 24 provided with aligned bores 26 and 28, respectively, also form part of the universal joint.

A hub 34 with mounted interconnected thrust washer strip 35, fits between the arms of the two yokes which are located rotationally at 90° to each other as shown.

A hole or opening 30 is provided in and perpendicular to the surface 32 of the hub 34. An aligned opening (not shown) is provided in the opposite surface of the hub 34, thus forming a pair of openings having a common axis. A similar opening 36 is also provided in the surface 38 of the hub 34. An aligned opening (not shown) is also provided in the opposite surface, thus providing a second pair of openings having a common axis. The second pair of openings has an axis which is perpendicular to the axis of the first pair of openings. The two axes of the openings intersect, in the hub of FIG. 1, but in hubs of other universal joints they may not intersect. If desired, the openings may be formed by boring holes completely through the hub 34.

Referring to FIG. 2 and FIG. 3, the new plastic thrust washer strip 35 includes a plurality of plastic washers 40 integrally interconnected by narrow, thin plastic webs or hinges 42. A male clasp member 44 is located on one end of the washer strip and extends from the free edge of one end washer 40. The male clasp member 44 engages the female clasp member 46 which is located on the other end of the washer strip and extends from the free edge of the other end washer 40.

A pair of diametrically spaced perpendicularly extending integral tab members 48 and 50 are located on the laterally outer portions of each of the plastic washers 40. The tab members are substantially perpendicular to, and extend below, the bottom plane of the line of washers 40 and thin plastic webs 42. Pairs of tabs are spaced apart just far enough to nicely locate the washers on the hub faces.

In some embodiments of the invention, it is not essential that there be pairs of tabs on each and every washer in the strip. It may be sufficient to have tabs on only one or two washers, and it may be sufficient to have a tab on a washer at one lateral side of the strip and another tab on another washer at the other lateral side of the strip, or series of such tabs.

Referring, to FIG. 1, the plastic thrust washer strip is shown mounted on the hub 34. The plastic tabs 48 and 50 are adapted to fit over the edges of the hub 34 and engage opposed surfaces of the hub. For universal joint assembly, the yokes 10 and 24 are then located in the proper position with respect to the hub 34 with the bores in the yokes substantially in line with the holes in the hub, and pivot pins are inserted through the bores of the yokes and into the proper openings in the hub to transmit operational turning torque between yoke and hub.

The new integral thrust washer strip is handled as a complete unit rather than as four separate thrust washers which have to be oriented and assembled as individual items. The thin webs 42 connecting the washers 40 act as hinges between washers and are used to help position the washer on the hub and also to prevent the washer from turning on the hub. The perpendicularly extending tabs 48 and 50 position the washer strip on the hub faces in a direction perpendicular in the direction of positioning by the thin strips 42, thus completely capturing the hub and making it impossible for the washers and hub to separate during assembly of the universal joint. Where desired, additional locating tabs may be added near or on the hinge webs to assist in locating the washers even more precisely on the faces of the hub, in a direction perpendicular to the location by the other tabs.

The particular clasp shown is a convenient method for joining the strip at its extremities. Other ways the strip could be joined at such extremities would include, for example, heat-welding or ultrasonic welding or chemical bonding. A set of individual washers or a set of two-washer strips could have locating tabs and clasps and could be assembled to the hub in comparable fashion.

The narrow plastic hinge section web 42 is shown in the preferred embodiment as being located at the base of the washers 40 (see FIG. 3). However, if desired, the webs 42 could be located at any depth along the washers, such as mid-way between the two surfaces of the washer. Also, in the preferred embodiment, the typical washer shape is shown with a round inner perimeter and a round outer perimeter. However, if desired, the perimeters could be any other convenient shapes. For example, the outer perimeter could have a rectangular shape conforming generally to the surface shape of the hub 34, so long as the shape does not interfere with proper pivoting of the yoke arms on the hub.

Although the thrust washers in the strip are shown flat, they may have other configurations, such as conical or wave form for example. Indeed, these latter shapes are used to provide a slight interference fit between the free-standing washers on the hub and the inside of the yoke arms. The washers will flatten down easily and not cause too much frictional drag as the arms pivot, yet the drag is great enough to hold the hub in position in the yoke arms during universal joint assembly. A similar positioning frictional drag may be produced while using flat washers, just by making the connecting webs between washers a slight bit longer than required in service so that there is a slight interference fit between the fitted strip and the yoke arms as the webs are deformed at installation of the hub plus washer strip between the yoke arms.

I claim:

1. A plastic thrust washer strip comprising: a plurality of integral interconnected plastic washers; and at least one tab on a washer at one lateral side of the strip and at least one tab on a washer at the other lateral side of the strip for locating said washer strip on the hub of a universal joint.

2. The plastic thrust washer strip of claim 1 wherein: the means for locating the washer strip on a universal joint hub includes a plastic clasp member on one of said washers and a plastic clasp member on another of said washers, said plastic clasp members being adapted to be joined together.

3. The plastic thrust washer strip of claim 1 wherein: the tabs are a pair of diametrically spaced tab members on the outside of at least one washer, said tab members being adapted to engage surfaces on the universal joint hub; and the means interconnecting the washers are thin plastic webs.

4. For use with a universal joint: a central pivoting and torque transmitting hub; a plastic thrust washer strip wrapped about said hub, the plastic thrust washer strip including four interconnected plastic thrust washers, one washer for each of four sides of the hub; and at least one tab on a washer at one lateral side of the strip and at least one tab on a washer at the other lateral side of the strip for locating the four plastic washers on the hub.

5. An assembly in accordance with claim 4 wherein the means interconnecting the plastic washers are thin plastic webs.

6. An assembly in accordance with claim 5, wherein the tabs are a pair of diametrically spaced outer tabs on at least one of the plastic washers perpendicular to the line of washers, said outer tabs being adapted to fit over the edges of the hub.

* * * * *